United States Patent [19]

Seki et al.

[11] Patent Number: 5,087,067
[45] Date of Patent: Feb. 11, 1992

[54] INFLATABLE BAG ASSEMBLY FOR PROTECTING A VEHICLE OCCUPANT

[75] Inventors: Kazuhiro Seki; Yukihiro Yamaguchi; Minoru Kanda; Satoshi Takizawa, all of Wako, Japan

[73] Assignee: Honda Giken Kogyo Kabushiki Kaisha, Tokyo, Japan

[21] Appl. No.: 525,014

[22] Filed: May 18, 1990

[30] Foreign Application Priority Data

May 19, 1989 [JP] Japan .................. 1-124140
May 19, 1989 [JP] Japan .................. 1-124141

[51] Int. Cl.5 ............................ B60R 21/22
[52] U.S. Cl. .................... 280/732; 280/743
[58] Field of Search ......... 280/728, 730, 732, 743; 180/90

[56] References Cited

U.S. PATENT DOCUMENTS

| | | | |
|---|---|---|---|
| 3,817,552 | 6/1974 | Knight | 280/732 |
| 3,874,693 | 4/1975 | Patzelt et al. | |
| 4,290,627 | 9/1981 | Cumming | 280/732 |
| 4,842,300 | 6/1989 | Ziomek | 280/732 |
| 4,915,410 | 4/1990 | Bachelder | 280/732 |

FOREIGN PATENT DOCUMENTS 56-43890 10/1981 Japan .
63-212147 9/1988 Japan ................. 280/743

Primary Examiner—Charles A. Marmor
Assistant Examiner—Karin Tyson
Attorney, Agent, or Firm—Armstrong, Nikaido, Marmelstein, Kubovcik & Murray

[57] ABSTRACT

An inflatable bag assembly is suitable for a seat of a vehicle such as an assistant driver's seat and has a bag which is inflatable in a curved configuration offset to one side. The bag is accommodated in a retainer case in a folded position. A gas generator has a gas outlet which is offset to one side with respect to the bag. Alternatively, the bag itself may be distributed less to one side of the retainer case than to the other side. Such a configuration of the gas generator or the bag allows the bag to begin inflating at the particular side mentioned above.

5 Claims, 3 Drawing Sheets

INFLATABLE BAG ASSEMBLY FOR PROTECTING A VEHICLE OCCUPANT

BACKGROUND OF THE INVENTION

The present invention relates to a protective inflatable bag assembly mounted on a vehicle for restraining an occupant in the event of a collision while the occupant is seated and, more particularly, to an inflatable bag assembly advantageously constructed and arranged to inflate a bag in a curved configuration.

An inflatable bag assembly is a typical protective implementation for restraining a vehicle occupant from moving forward due to inertia in the event of a collision, thereby preventing the occupant from hitting against a steering wheel or an instrument panel. Specifically, an inflatable bag assembly has a gas generator for emitting a gas in the event of a collision, and a bag to be inflated by the gas. As the gas generator is ignited, the bag is inflated in a moment toward a vehicle occupant to receive the occupant who tends to move forward. The bag is usually accommodated in a folded position in a retainer case which is mounted on a steering wheel or an instrument panel which is located in front of the occupant. The gas generator has a gas outlet which faces the inner periphery of the bag.

It has been customary to arrange the bag substantially evenly in the retainer case and to locate the gas outlet of the gas generator at the center of the retainer case.

To allow the inflatable bag assembly to effectively receive an occupant, it is preferable that the bag in the inflated position contacts the front of the occupant over a broad area. A prerequisite is, therefore, that the bag be provided with a flat shape at the final stage of inflation.

However, when the gas outlet is located to face the central portion of the bag as stated above, the bag begins to inflate at a central portion thereof in the event when the assembly is operated. Assuming the bag is configured to have a flat configuration at the final stage of inflation, the central portion of the bag entrains a peripheral portion in the direction of gas emission at the initial stage until the peripheral portion has been fully stretched. After the central portion of the bag has been bulged to a considerable degree, the peripheral portion bulges sideways due to the increase in the pressure in the bag while the central portion, in turn, recedes. Consequently, the bag reaches the predetermined configuration. In this manner, the bag flutters during the course of inflation and is apt to fail to reach the desired configuration at an adequate timing.

To eliminate the above problem, bulging of the central portion of the bag may be restricted by cords or similar implements, as disclosed in Japanese Patent Publication No. 43890/1981 and corresponding U.S. Pat. No. 3,074,693. This kind of implementation, however, increases the production cost of such a protective bag assembly because a number of cords have to be arranged in the bag and each has to be affixed at opposite ends thereof to the central portion of the bag and the retainer case.

To promote effective restraint on the occupant, it is often desired that the bag be inflated in an irregular configuration. Concerning the assembly assigned to the driver's seat, for example, the retainer case is disposed at the center of a steering wheel which faces the occupant of the driver's seat so that the bag may bulge out from the retainer case to receive the upper part of the occupant. In this instance, it is desirable to restrain not only the upper part but also the abdomen of the occupant by inflating the bag in the downward direction also. On the other hand, an instrument panel that faces a seat next to the driver's seat, i.e., assistant driver's seat has a ventilation duct or the like in its rear upper end portion as viewed in the front-and-rear direction of the vehicle. This portion, therefore, does not have a space large enough to accommodate a protective bag assembly. Hence, the assembly associated with the assistant driver's seat has to be mounted on the upper end of the instrument panel that is located in front of the seat of interest. In order that such a bag which bulges out from the retainer case may restrain the occupant of the assistant driver's seat, it has to be extended as far as the position between the rear end of the instrument panel and the occupant, i.e., it has to be curved by a large angle rearward and downward. Even if cords are used as stated earlier, it is difficult to regulate the configuration of such a bag which is to be curved by a large angle as stated above.

SUMMARY OF THE INVENTION

It is therefore an object of the present invention to provide an inexpensive inflatable bag assembly which allows a bag thereof to inflate rapidly to a predetermined configuration without resorting to cords or similar extra implements.

It is another object of the present invention to provide an inflatable bag assembly which allows even a curved bag to inflate smoothly so as to surely restrain a vehicle occupant.

It is another object of the present invention to provide an inflatable bag assembly for an assistant driver's seat which allows a bag protruding from a retainer case to effectively restrain a vehicle occupant, despite being mounted on the upper end of an instrument panel.

In order to achieve the above objects, the present invention locates the gas outlet of a gas generator in and at one side of a retainer case and/or disposes a greater part of a bag in and at one side in the retainer case than at the other side. When both the gas outlet and the bag are so arranged, the gas outlet is positioned at the side where a smaller part of the bag is accommodated.

When the inflatable bag assembly having the above construction is ignited, the gas issuing from the gas outlet causes the bag to begin inflating at a portion thereof which has a smaller area and faces the gas outlet. The gas is guided by the inflated portion of the bag to run around to the other side, whereby the other portion of the bag is sequentially inflated. This prevents the bag from bulging greatly in the direction of gas emission and, therefore, allows even a greatly curved bag to inflate smoothly.

In a preferred embodiment of the present invention, the bag is distributed less to one side than to the other side within the retainer case. The gas generator is located at the back of the side where the bag distribution is sparse. This promotes the effective use of a dead space at the back of the retainer case and thereby renders the entire assembly compact.

Assuming that the inflatable bag assembly is assigned to the assistant driver's seat, it is mounted on the instrument panel such that the retainer case is open at the upper end of the instrument panel. The bag distribution is sparse in a front portion of the retainer case with respect to the front-and-rear direction of the vehicle body. The gas outlet is also located at the front side of the retainer case. In such a configuration, the bag bulging out from the retainer case is curved downward.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
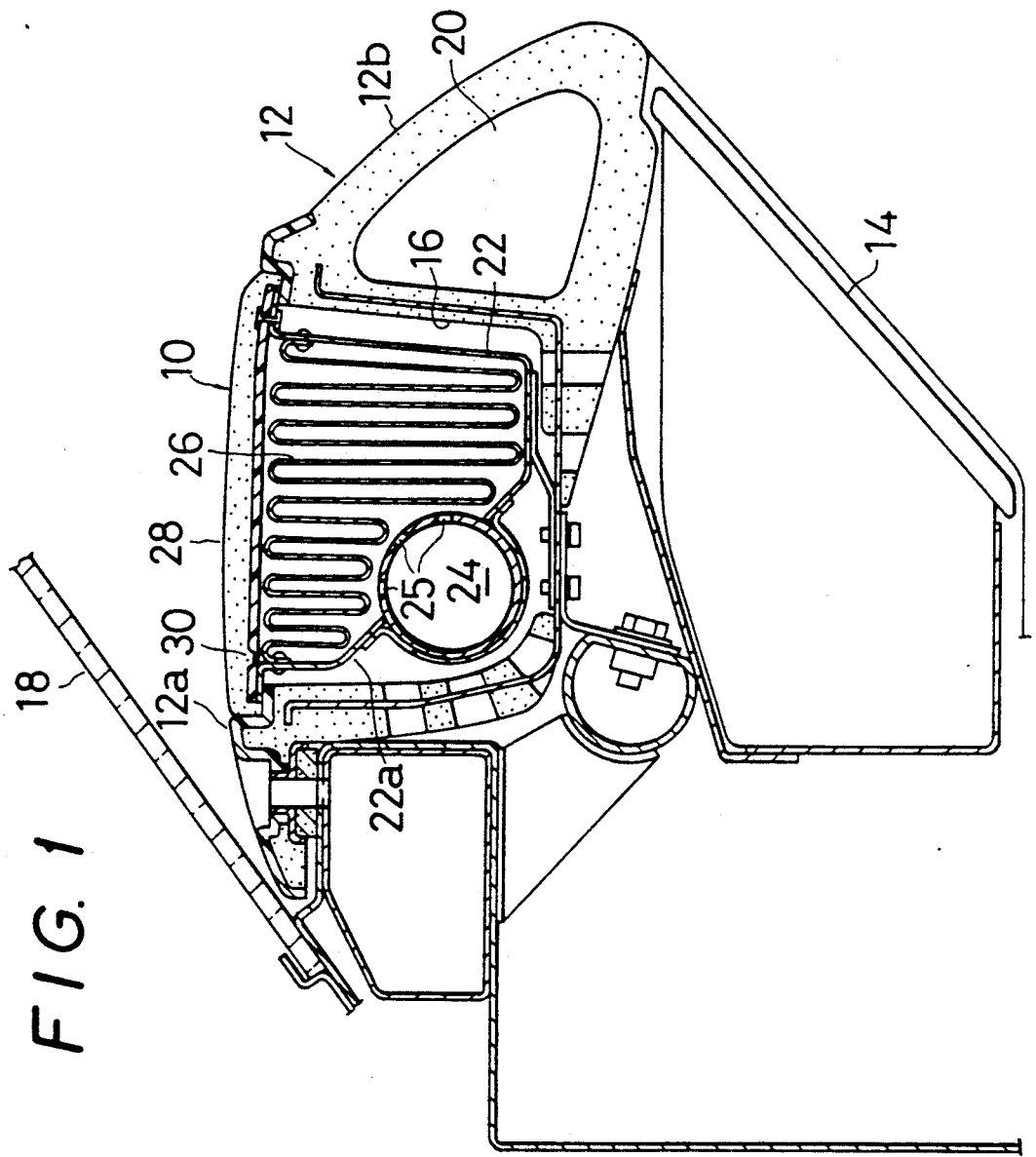
FIG. 1 is a vertical section of an instrument panel of a vehicle on which an inflatable bag assembly embodying the present invention is mounted.

Referring to FIG. 1 of the drawings, an inflatable bag assembly embodying the present invention is shown and generally designated by the reference numeral 10. As shown, the assembly 10 is mounted on an instrument panel 12 in such a manner as to face an assistant driver's seat of a vehicle. Specifically, a cavity 16 having a substantially rectangular cross-section is formed in a central portion of the upper end 12a of the instrument panel 12 that faces the assistant driver's seat. A glove compartment 14 is disposed below the above-mentioned portion of the instrument panel 12. A windshield 18 extends upward and rearward above the assembly 10. A ventilation duct 20 is defined in the instrument panel 12 at the rear of the assembly 10, i.e., at the front seat side.

The inflatable bag assembly 10 has a top-open retainer case 22 which is provided with a generally right-angled triangular cross-section. Specifically, the retainer case 22 has a front wall 22a extending rearward and downward, so that the internal space or volume of the retainer case 22 sequentially increases toward the rear end of the instrument panel 12 (i.e., toward the seat).

A cylindrical gas generator 24 is mounted on a central portion of the front wall 22a of the retainer case 22 with a part of its periphery protruding into the retainer case 22. An explosive or similar gas generating agent is confined in the gas generator 24. When the explosive is ignited, the gas generator 24 expels a high-pressure combustion gas through a gas outlet 25 thereof. The gas outlet 25 is formed through a part of the wall of the gas generator 24 which is disposed in the retainer case 22. The gas outlet 25 is, therefore, located in and close to the front end of the retainer case 22. An arrangement is made such that when a collision is detected in terms of the deceleration of the vehicle, for example, the gas generating agent in the gas generator 24 is ignited.

An inflatable bag 26 is accommodated in the retainer case 22 in a folded position. The bag 26 is made of a flexible material and open at one end thereof. The open end of the bag 26 is connected air-tight to the edge of the retainer case 22 that defines an opening in the upper end of the case 22. In this configuration, the gas emitted from the gas generator 24 into the retainer case 22 as previously mentioned is introduced into the bag 26 to inflate it to a protective position.

The internal space of the retainer case 22 sequentially decreases toward the front end of the vehicle body, as stated earlier. The gas generator 24 located close to the front end of the retainer case 22 further reduces the volume available in the front end portion of the retainer case 22 for accommodating the bag 26. Therefore, a greater part of the bag 26 is housed in the rear portion of the retainer case 22. In this sense, the front and rear portions of the retainer case 22 serve as a smaller and a larger housing portion, respectively. The outlet of the gas generator 24 is located at the back of the smaller housing portion.

Figure 4:
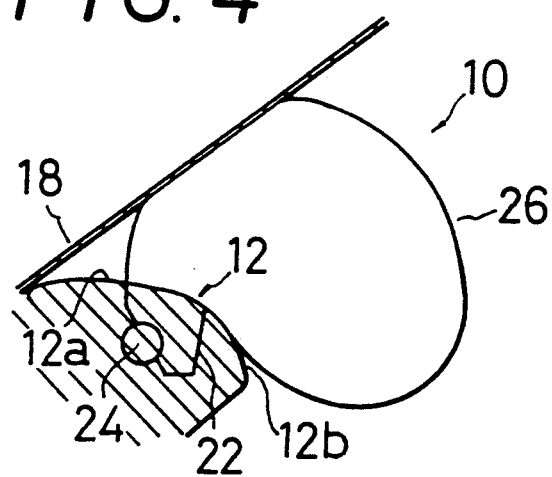

As shown in FIG. 4, when the bag 26 is fully inflated, it is curved such that the front end extends along the windshield 18 and the rear end reaches the rear end 12b of the instrument panel 12.

The open top of the retainer case 22 is usually closed by a lid 28 which is flush with the upper end 12a of the instrument panel 12. The front edge of the lid 28 is connected to the retainer case 22 by a hinge 30, while the rear end of the lid 28 is detachably connected to the retainer case 22 by shear pins, for example. Hence, the lid 28 is openable about the hinge 30 when urged from below.

The inflatable bag assembly 10 associated with the assistant driver's seat as stated above is operated as follows.

As shown in FIG. 1, the air bag 26 is usually accommodated in the retainer case 22 in a folded position, and the open top of the retainer case 22 is closed by the lid 28. In this condition, the instrument panel 12 has the same appearance as an ordinary instrument panel.

When the vehicle is sharply decelerated due to a collision, an acceleration sensor or similar sensor senses it and fires the gas generating agent confined in the gas generator 24. Then, the gas generator 24 blows expels off a high-pressure combustion gas. The gas urges the air bag 26 against the underside of the lid 28 with the result that the lid 28 is forced upward about the hinge 30 to uncover the open top of the retainer case 22. Consequently, the bag 26 bulges from the upper end 12a of the instrument panel 12 via the open top of the retainer case 22.

Figure 2:
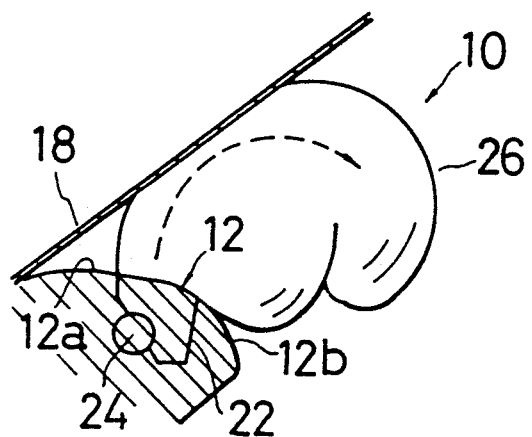
FIGS. 2, 3 and 4 are side elevations each schematically showing an inflatable bag included in the assembly of FIG. 1 at a particular stage of inflation.

The gas outlet of the gas generator 24 is positioned close to the front end of the retainer case 22, as stated previously. Hence, the bag 26 begins to inflate at its front portion that faces the gas outlet of the gas generator 24. This, coupled with the fact that the front portion of the bag 26 has a comparatively small area, causes the front portion to fully stretch in a moment and thereby put it under tension. As a result, the front end of the air bag 26 extends along the windshield 18, as shown in FIG. 2. At this time, the rear end portion of the air bag 26 having a comparatively large area and accommodated in the rear portion of the retainer case 22 is still left in the folded position, so that the center of gravity of the entire bag 26 is positioned in the vicinity of the rear lower end of the bag 26. At this stage of inflation, therefore, a moment tending to bend the rear portion of the bag 26 downward acts on the bag 26.

Figure 3:
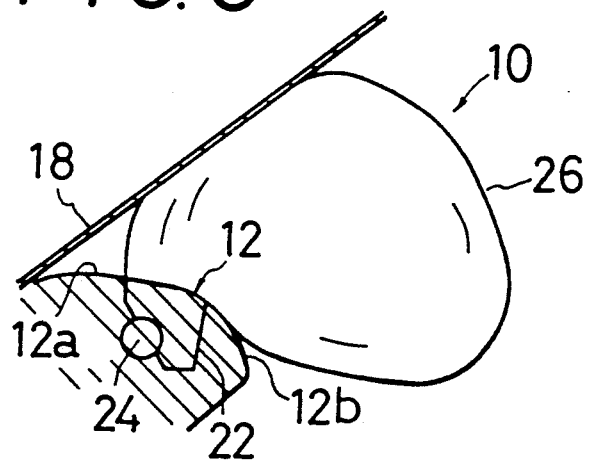

By the procedure described so far, the upper end of the bag 26 is provided with a smooth curvature. This allows the gas generated by the gas generator 24 to reach the rear portion of the bag 26 along the upper end of the bag 26, thereby inflating the rear lower portion of the bag 26, as shown in FIG. 3. Hence, the bag 26 is fully and smoothly inflated to the position shown in FIG. 4 without fluttering.

When the bag 26 is inflated to the position of FIG. 4, the windshield 18 supports the head and breast of an occupant on the front seat of interest through the upper portion of the bag 26, while the rear end 12b of the instrument panel 12 supports the abdomen of the occupant through the lower portion of the bag 26. In this condition, the force being exerted forward by the occupant on the bag 26 is born over a substantial area extending from the windshield 18 to the rear end 12b of the instrument panel 12. The occupant is, therefore, surely restrained in the seated position.

As stated above, the illustrative embodiment allows the bag 26 to inflate smoothly to a predetermined configuration without fluttering simply by changing the condition wherein the bag 26 is housed and the position where the gas generator 24 is mounted, compared to the prior art. This eliminates the need for cords or similar extra implementation and thereby reduces the cost. Moreover, the restraint on the occupant is improved because the bag 26 inflates to the final position rapidly.

The part of the bag 26 that faces the gas outlet is adjustable both in amount and position so as to control the change in the shape of the bag 26 during the course of inflation. Hence, even if the bag 26 has a greatly curved configuration, it can be inflated and developed smoothly.

Since the bag 26 can be inflated to a greatly curved position as stated above, it is possible to stretch the bag 26 to the rear of the rear end 12b of the instrument panel 12. This is successful in further promoting the restraint on the occupant. Locating the inflatable bag assembly 10 in the vicinity of the upper end of the instrument panel 12 as shown and described is desirable in increasing the design freedom of the instrument panel 12.

The retainer case 22 has thereinside the larger and smaller housing portions, as stated previously. The gas generator 24 is accommodated in the space which is available at the back of the smaller housing portion. This allows the assembly 10 to be bodily housed in the cavity 16 having a rectangular cross-section, contributing a great deal to the efficient use of a limited space.

While the foregoing description has concentrated on the assistant driver's seat, the present invention is, of course, applicable to any other seat of a vehicle such as the driver's seat. Concerning the driver's seat, a retainer case may be mounted on a steering wheel while accommodating a smaller part of an inflatable bag in an upper portion thereof, in which case a gas generator will be so oriented as to locate its gas outlet above the bag. In this configuration, the bag will be inflated downward to restrain the driver's abdomen.

The present invention is also practicable with an inflatable bag assembly of the type emitting a gas into the retainer case 22 by way of a gas duct, as distinguished from exposing the gas generator 24 directly to the interior of the retainer case 22. In such a case, the gas duct may be inclined such that the outlet thereof faces one side of the fixed edge portion of the bag 26.

The retainer case 22 may be provided with a suitable configuration other than the triangular configuration shown and described, e.g. a stepped configuration which is shallow at one side and deep at the other side. If desired, the retainer case 22 may be provided with a conventional configuration and, instead, the bag 26 may be folded in a particular manner such that a smaller part thereof is housed at one side of the case 22. Further, the bag 26 may be distributed substantially evenly in the entire retainer case 22 if the gas outlet of the gas generator 24 is located in an offset position.

Figure 6:
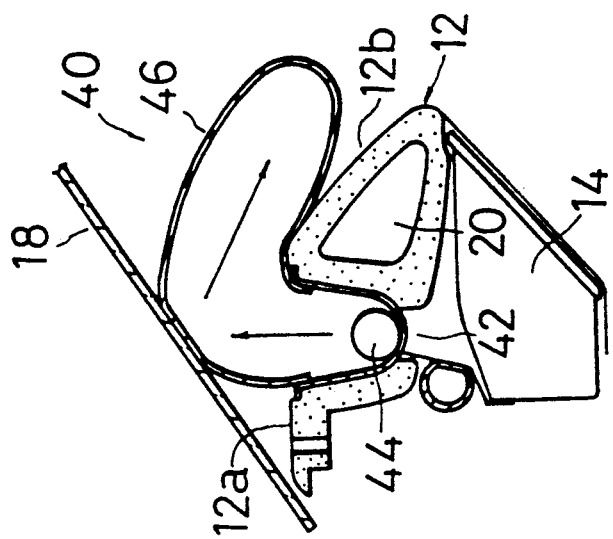
FIG. 6 is a view showing an inflatable bag included in the assembly of FIG. 5 at a particular stage of inflation.
Figure 5:
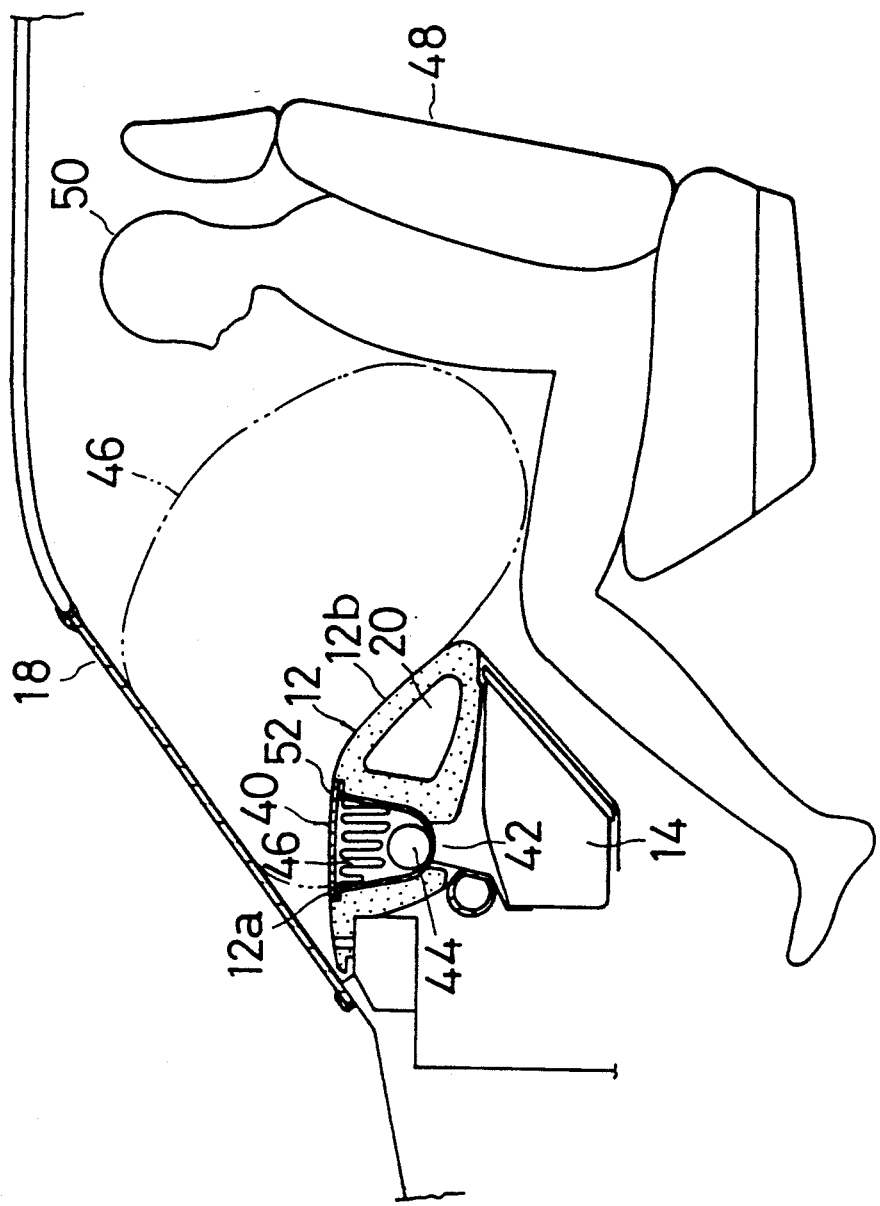
FIG. 5 is a vertical section showing a front part of a vehicle cabin and representative of an alternative embodiment of the present invention.

Referring to FIGS. 5 and 6, an alternative embodiment of the present invention is shown which further enhances the restraint on the occupant's abdomen. As shown, the inflatable bag assembly, generally 40, has a retainer case 42 having a relatively great depth. The retainer case 42 extends in substantially the vertical direction in the instrument panel 12, so that its open top faces the windshield 18 at a substantial angle to the latter. A gas generator 44 is mounted on the retainer case 42 at a lower end portion of the case 42 and has a gas outlet which is exposed to the interior of the case 42.

In this embodiment, when the gas generator 44 is ignited, the resultant gas fills the retainer case 42 and flows upward toward the windshield 18 via the open top of the case 42.

An inflatable bag 46, like the bag 26 of the previous embodiment, is accommodated in the retainer case 42 in a folded position. The bag 46 is configured such that, on inflation, the front end is restricted along the windshield 18 while the rear portion lower protrudes to between the rear end 12b of the instrument panel 12 and the abdomen of an occupant 50 who is seated on an assistant driver's seat 48, as indicated by a dash-and-dots line in FIG. 5. Specifically, the bag 46 is greatly bent rearward and downward.

The open top of the retainer case 42 is usually closed by a lid 52 which is flush with the upper end 12a of the instrument panel 12. The lid 52 is connected to the retainer case 42 by a hinge and, when the bag 46 is inflated, forced to open from below by the resultant pressure.

When the vehicle with the inflatable bag assembly 40 is sharply decelerated due to a collision, the gas generator 44 is ignited to generate a high-pressure combustion gas. The gas forces the bag 46 upward to thereby open the lid 52 away from the retainer case 42. Then, the bag 46 bulges from the upper end 12a of the instrument panel 12.

At this time, the gas filling the retainer case 42 is jetted out through the open top of the retainer case 42 mainly upward in which direction the open top of the case 42 is oriented. The bag 46 is, therefore, inflated upward resulting in the front end thereof stretching along the windshield 18. As shown in FIG. 6, the gas flowing out through the open top of the retainer case 42 is reflected by the front portion of the bag 46 having been regulated along the windshield 18. Since the windshield 18 is inclined upward and rearward, the reflected gas from the windshield 18 flows to a rear lower portion of the bag 46. As a result, the rear lower portion of the bag 46 is inflated downward to protrude between the rear end 12b of the instrument panel 12 and the occupant 50.

Subsequently, the rear upper portion of the bag 46 is inflated. Actually, however, the rear upper portion of the bag 46 is inflated substantially simultaneously with the rear lower portion because the gas does not flow uniformly, i.e., a part of the gas reflected by the front shield 18 flows toward the rear upper portion of the bag 46. Finally, the bag 46 is inflated to the position indicated by the dash-and-dots line in FIG. 5.

The inflation of the bag 46 is completed in a moment. The occupant 50 tends to move forward due to inertia in the event of a collision and, therefore, hits against the bag 46, exerting a force forward on the bag 46. The rear lower portion of the bag 46 is situated between the rear end 12b of the instrument panel 12 and the abdomen of the occupant 50, so that the force exerted by the occupant's abdomen is born by the rear end 12b of the instrument panel 12. The forces exerted by the head and breast of the occupant 50 are born by the windshield 18. In this manner, the occupant 50 is restrained by the bag 46 over his or her entire front end.

As stated above, the inflatable bag assembly 40 causes the rear lower portion of the bag 46 to inflate rapidly to protrude between the instrument panel 12 and the occupant 50 on the assistant driver's seat 48. The bag 46, therefore, receives the abdomen of the occupant 50 to thereby restrain the occupant's lower part from moving forward. The forces exerted foward by the occupant 50 on the bag 46 are born over a broad range extending from the windshield 18 to the rear end 12b of the instrument panel 12. This insures the restraint on the occupant 50.

The bag 46, like the bag 26 of the previous embodiment, may be distributed less to the front portion of the retainer case 42 than to the rear portion. This will allow the bag 46 to inflate more smoothly without fluttering. The direction in which the gas is emitted may be adjusted by using a deflecting plate or similar implement, if desired.

Various modifications will become possible for those skilled in the art after receiving the teachings of the present disclosure without departing from the scope thereof.

What is claimed is:

1. An inflatable bag assembly for protecting an occupant of a vehicle comprising:

a retainer case mounted on an instrument panel of the vehicle, said retainer case is open at an upper end of said instrument panel, said retainer case having a front wall extending rearward and downward so that an internal space thereof sequentially increases toward a rear side of said retainer case with respect to a front-and-rear direction of a body of the vehicle;

an inflatable bag accommodated in said retainer case in a folded position, said bag is distributed less to a front side of said retainer case than to said rear side thereof; and a gas generator for expelling a gas into said bag to inflate said bag, said gas generator has a gas outlet which is located in and at the front side of said retainer case.

2. An assembly, as claimed in claim 1, wherein said bag is made of a flexible material and open at one end thereof, the open end of the bag is connected air-tightly to an edge of the retainer case that defines an opening in an upper end of the retainer case.

3. An assembly, as claimed in claim 2, wherein a front portion of said bag has a comparatively small area compared with a rear portion of said bag.

4. An assembly, as claimed in claim 2, wherein when said bag is fully inflated, a front end of said bag extends along a windshield of the vehicle and a rear end of the bag reaches a rear end of said instrument panel.

5. An assembly as claimed in claim 2, wherein said retainer case has a comparatively larger accommodating portion for accommodating a greater part of said bag and a comparatively smaller accommodating portion for accommodating a smaller part of said bag, said gas generator being located at a back of said smaller accommodating portion.

* * * * *